United States Patent
Bao et al.

(10) Patent No.: US 12,360,939 B2
(45) Date of Patent: Jul. 15, 2025

(54) DATA TRANSMISSION METHOD ACCORDING TO INTER-INTEGRATED CIRCUIT PROTOCOL AND TRANSMISSION APPARATUS

(71) Applicant: Shenzhen Yinwang Intelligent Technologies Co., Ltd., Guangdong (CN)

(72) Inventors: Pengxin Bao, Chengdu (CN); Xingxin Zhang, Chengdu (CN); Chao Li, Chengdu (CN); Xuehuan Wang, Chengdu (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/959,541

(22) Filed: Oct. 4, 2022

(65) Prior Publication Data

US 2023/0021703 A1    Jan. 26, 2023

Related U.S. Application Data

(63) Continuation of application No. PCT/CN2020/083441, filed on Apr. 7, 2020.

(51) Int. Cl.
*G06F 13/42* (2006.01)

(52) U.S. Cl.
CPC .. *G06F 13/4282* (2013.01); *G06F 2213/0016* (2013.01)

(58) Field of Classification Search
None
See application file for complete search history.

(56) References Cited

U.S. PATENT DOCUMENTS

| 8,558,577 B1 * | 10/2013 | Soriano Fosas ... H03K 19/0175 326/62 |
| 2006/0129370 A1 * | 6/2006 | Unger ................. G06F 13/4045 703/20 |

(Continued)

FOREIGN PATENT DOCUMENTS

| CN | 102023954 A | 4/2011 |
| CN | 102026281 A | 4/2011 |

(Continued)

OTHER PUBLICATIONS

Integrated Circuits, p. 1-9 (Year: 2004).*

(Continued)

*Primary Examiner* — Henry Tsai
*Assistant Examiner* — Dean Phan
(74) *Attorney, Agent, or Firm* — WOMBLE BOND DICKINSON (US) LLP

(57) ABSTRACT

A data transmission method according to an I2C protocol and a transmission apparatus includes: a first transmission chip obtains I2C data from a first device, wherein the I2C data is data sent by the first device to a second device. The first transmission chip sends first feedback information to the first device, wherein the first feedback information is used to indicate whether the I2C data is successfully received. The first transmission chip forwards the I2C data to a second transmission chip corresponding to the second device. The first transmission chip receives second feedback information from the second transmission chip, and the second feedback information is used to indicate whether the I2C data is successfully received. The first transmission chip stores the second feedback information in a first storage space that is storage space of the first transmission chip.

16 Claims, 10 Drawing Sheets

(56) References Cited

U.S. PATENT DOCUMENTS

| | | | |
|---|---|---|---|
| 2006/0206636 A1 | 9/2006 | McLeod | |
| 2007/0250648 A1 | 10/2007 | Picard et al. | |
| 2010/0238939 A1* | 9/2010 | Lee | H04L 1/1854 370/400 |
| 2011/0103404 A1 | 5/2011 | Bafra et al. | |
| 2015/0100820 A1* | 4/2015 | Faulhaber | G06F 11/1441 714/6.12 |
| 2016/0373338 A1* | 12/2016 | Suzuki | G06F 3/0604 |
| 2018/0173671 A1 | 6/2018 | Fujiki et al. | |
| 2020/0012611 A1 | 1/2020 | Van Bourgognie et al. | |

FOREIGN PATENT DOCUMENTS

| | | |
|---|---|---|
| CN | 102169463 A | 8/2011 |
| CN | 102355462 B | 5/2015 |
| CN | 104598418 A | 5/2015 |
| CN | 105095139 A | 11/2015 |
| CN | 105912354 A | 8/2016 |
| CN | 105975425 A | 9/2016 |
| CN | 109981480 A | 7/2019 |
| CN | 209357068 U | 9/2019 |
| CN | 209920986 U | 1/2020 |
| JP | 2000312220 A | 11/2000 |
| JP | 2011044100 A | 3/2011 |
| JP | 2015154260 A | 8/2015 |
| JP | 2015230672 A | 12/2015 |
| TW | 201536605 A | 10/2015 |

OTHER PUBLICATIONS

Anonymous: "The I2C-bus specification Version 2.1", Philips Semiconductors. Product Specification, Jan. 1, 2000, total 46 pages.

* cited by examiner

DATA TRANSMISSION METHOD ACCORDING TO INTER-INTEGRATED CIRCUIT PROTOCOL AND TRANSMISSION APPARATUS

CROSS-REFERENCE TO RELATED APPLICATIONS

This application is a continuation of International Application No. PCT/CN2020/083441, filed on Apr. 7, 2020, the disclosure of which is hereby incorporated by reference in its entirety.

TECHNICAL FIELD

This application relates to the communications field, and in particular, to a data transmission method according to an inter-integrated circuit protocol and a transmission apparatus.

BACKGROUND

Currently, there are two manners of long-distance data transmission according to an inter-integrated circuit (I2C) protocol. Manner 1: Each time a transmission chip #1 corresponding to a master device receives 1-bit I2C data from the master device, the transmission chip #1 transmits the received 1-bit I2C data to a transmission chip #2 corresponding to a slave device, and then the transmission chip #2 further sends the received 1-bit I2C data to the slave device. The master device repeats the foregoing operations to transmit 8-bit I2C data to the slave device. Manner 2: Each time a transmission chip #1 receives 8-bit I2C data from a master device, the transmission chip #1 transmits the received 8-bit I2C data to a transmission chip #2, and then the transmission chip #2 further sends the received 8-bit I2C data to a slave device.

However, in the foregoing two manners, according to an I2C data transmission mechanism, after sending the 8-bit I2C data, the master device can send next I2C data only after receiving 1-bit feedback information (the slave device sends the feedback information to the transmission chip #2, the transmission chip #2 transmits the feedback information to the transmission chip #1, and then the transmission chip #1 sends the feedback information to the master device). Therefore, an effective rate of long-distance I2C data transmission is low.

SUMMARY

This application provides a data transmission method according to an I2C protocol, to improve an effective rate of long-distance I2C data transmission.

According to a first aspect, a data transmission method according to an I2C protocol is provided. The method includes: A first transmission chip obtains I2C data from a first device, where the I2C data is data sent by the first device to a second device, and the first transmission chip corresponds to the first device; the first transmission chip sends first feedback information to the first device, where the first feedback information is used to indicate whether the I2C data is successfully received; the first transmission chip forwards the I2C data to a second transmission chip corresponding to the second device; the first transmission chip receives second feedback information from the second transmission chip, where the second feedback information is used to indicate whether the I2C data is successfully received; and the first transmission chip stores the second feedback information in first storage space, where the first storage space is storage space of the first transmission chip.

Based on the foregoing technical solution, in a process in which the first device sends the I2C data to the second device, the first transmission chip returns one piece of feedback information (that is, the first feedback information) to the first device based on whether the I2C data is successfully received. In this way, an I2C interface between the first device and a transmission chip #1 can be continuously used for transmission, thereby improving an effective rate of I2C data transmission. In addition, the second transmission chip transmits received real feedback information (that is, the second feedback information) from the second device to the first transmission chip, so that the first device may obtain the real feedback information of a slave device from the first transmission chip.

In some embodiments, the first device may be a master device, and the second device is a slave device.

In some embodiments, the first device may be a slave device, and the second device is a master device.

With reference to the first aspect, in some embodiments of the first aspect, that the first transmission chip forwards the I2C data to a second transmission chip corresponding to the second device includes: After an amount of at least one piece of I2C data stored in second storage space meets a preset condition, the first transmission chip forwards the stored at least one piece of I2C data to the second transmission chip, where the second storage space is storage space of the first transmission chip, the at least one piece of I2C data is from the first device, and the at least one piece of I2C data includes the I2C data.

Based on the foregoing technical solution, after obtaining a plurality of pieces of I2C data, the first transmission chip may forward the plurality of pieces of I2C data to the second transmission chip. In this way, a transmission frequency of a long-distance transmission data packet between the first transmission chip and the second transmission chip is decoupled from a transmission rate of the I2C data. In other words, the transmission frequency of the long-distance transmission data packet may be less than the transmission rate of the I2C data. Therefore, the long-distance transmission data packet may be larger, thereby improving transmission efficiency of long-distance transmission.

With reference to the first aspect, in some embodiments of the first aspect, that the first transmission chip receives second feedback information from the second transmission chip includes: The first transmission chip receives third feedback information from the second transmission chip, where the third feedback information is used to indicate second feedback information respectively corresponding to one or more pieces of I2C data including the I2C data.

It may be understood that the second feedback information is fed back by the slave device for one piece of received I2C data. In other words, the second feedback information fed back by the slave device is in a one-to-one correspondence with the I2C data received by the slave device.

With reference to the first aspect, in some embodiments of the first aspect, after the first transmission chip receives second feedback information from the second transmission chip, the method further includes: The first transmission chip sets the second storage space to a write-inhibit state.

With reference to the first aspect, in some embodiments of the first aspect, that a first transmission chip obtains I2C data from a first device includes: The first transmission chip reads the I2C data stored in the second storage space.

According to a second aspect, a data transmission method according to an I2C protocol is provided. The method includes: A second transmission chip receives I2C data from a first transmission chip corresponding to a first device, where the second transmission chip corresponds to a second device; the second transmission chip sends the I2C data to the second device; the second transmission chip receives second feedback information from the second device, where the second feedback information is used to indicate whether the I2C data is successfully received; and the second transmission chip sends the second feedback information to the first transmission chip.

Based on the foregoing technical solution, in a process in which the first device sends the I2C data to the second device, the first transmission chip returns one piece of feedback information (that is, the first feedback information) to the first device based on whether the I2C data is successfully received. In this way, an I2C interface between the first device and a transmission chip #1 can be continuously used for transmission, thereby improving an effective rate of I2C data transmission. In addition, the second transmission chip transmits received real feedback information (that is, the second feedback information) from the second device to the first transmission chip, so that the first device may obtain the real feedback information of a slave device from the first transmission chip.

In some embodiments, the first device may be a master device, and the second device is a slave device.

In some embodiments, the first device may be a slave device, and the second device is a master device.

With reference to the second aspect, in some embodiments of the second aspect, the second transmission chip sends the second feedback information to the first transmission chip includes: The second transmission chip sends third feedback information to the first transmission chip, where the third feedback information is used to indicate second feedback information respectively corresponding to one or more pieces of I2C data including the I2C data.

It may be understood that the second feedback information is fed back by the slave device for one piece of received I2C data. In other words, the second feedback information fed back by the slave device is in a one-to-one correspondence with the I2C data received by the slave device.

With reference to the second aspect, in some embodiments of the second aspect, the second transmission chip sends third feedback information to the first transmission chip includes: The second transmission chip sends the third feedback information to the first transmission chip when a preset trigger condition is met, where the preset trigger condition is that an amount of the second feedback information meets a preset condition; and/or the preset trigger condition is that at least one of the one or more pieces of I2C data fails to be received.

With reference to the second aspect, in some embodiments of the second aspect, the method further includes: The second transmission chip stores at least one piece of I2C data from the first transmission chip in third storage space, where the third storage space is storage space of the second transmission chip, and the at least one piece of I2C data includes the I2C data.

Based on the foregoing technical solution, after obtaining a plurality of pieces of I2C data, the first transmission chip may forward the plurality of pieces of I2C data to the second transmission chip. In this way, a transmission frequency of a long-distance transmission data packet between the first transmission chip and the second transmission chip is decoupled from a transmission rate of the I2C data. In other words, the transmission frequency of the long-distance transmission data packet may be less than the transmission rate of the I2C data. Therefore, the long-distance transmission data packet may be larger, thereby improving transmission efficiency of long-distance transmission.

According to a third aspect, a data transmission method according to an I2C protocol is provided. The method includes: A master device sends I2C data to a first transmission chip, where the first transmission chip corresponds to the master device; the master device receives first feedback information from the first transmission chip, where the first feedback information is used to indicate whether the I2C data is successfully received; and the master device reads first storage space corresponding to the first transmission chip to obtain second feedback information, where the second feedback information is used to indicate whether the I2C data is successfully received.

Based on the foregoing technical solution, in a process in which the master device writes data to a slave device, the first transmission chip returns one piece of feedback information (that is, the first feedback information) to the master device based on whether the I2C data is successfully received. In this way, an I2C interface between the master device and the first transmission chip can be continuously used for transmission, thereby improving an effective rate of I2C data transmission. In addition, the second transmission chip transmits real feedback information (that is, the second feedback information) of the slave device to the first transmission chip. Further, the master device may obtain the real feedback information of the slave device from in the first transmission chip.

With reference to the third aspect, in some embodiments of the third aspect, that the master device reads first storage space corresponding to the first transmission chip includes: The master device periodically reads the first storage space.

With reference to the third aspect, in some embodiments of the third aspect, before the master device reads first storage space corresponding to the first transmission chip, the method further includes: The master device determines that second storage space corresponding to the first transmission chip is in a write-inhibit state.

According to a fourth aspect, a transmission apparatus is provided, including modules or units configured to perform the method in any one of the first aspect and the possible implementations of the first aspect.

According to a fifth aspect, a transmission apparatus is provided, including modules or units configured to perform the method in any one of the second aspect and the possible implementations of the second aspect.

According to a sixth aspect, a transmission apparatus is provided, including a processor. The processor is coupled to a memory, and may be configured to execute instructions in the memory, to implement the method according to any one of the first aspect and the second aspect or the possible implementations of the first aspect and the second aspect.

According to a seventh aspect, a communications apparatus is provided, including modules or units configured to perform the method in any one of the third aspect and the possible implementations of the third aspect.

According to an eighth aspect, a communications apparatus is provided, including a processor. The processor is coupled to a memory, and may be configured to execute instructions in the memory, to implement the method in any one of the third aspect and the possible implementations of the third aspect.

According to a ninth aspect, a processor is provided, including an input circuit, an output circuit, and a processing circuit. The processing circuit is configured to: receive a signal by using the input circuit, and transmit the signal by using the output circuit, so that the processor performs the method according to any one of the first aspect to the third aspect or the possible implementations of the first aspect to the third aspect.

In some embodiments, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments.

According to a tenth aspect, a processing apparatus is provided. The processing apparatus includes a processor, and may further include a memory. The memory is configured to store instructions, and the processor is configured to read the instructions stored in the memory, receive a signal by using a receiver, and transmit the signal by using a transmitter, to perform the method in any one of the first aspect to the third aspect or the possible implementations of the first aspect to the third aspect.

In some embodiments, there are one or more processors, and there are one or more memories.

In some embodiments, the memory may be integrated with the processor, or the memory and the processor may be separately disposed.

In some embodiments, the memory may be a non-transitory memory, such as a read-only memory (ROM). The memory and the processor may be integrated into one chip, or may be disposed in different chips. A type of the memory and a manner in which the memory and the processor are disposed are not limited in the embodiments of this application.

It should be understood that, for a related data exchange process, for example, an indication information sending process may be a process of outputting indication information from the processor, and a capability information receiving process may be a process of receiving input capability information by the processor. In some embodiments, data output by the processor may be output to the transmitter, and input data received by the processor may be from the receiver. The transmitter and the receiver may be collectively referred to as a transceiver.

The processing apparatus according to the tenth aspect may be a chip. The processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in a memory. The memory may be integrated into the processor, or may be located outside the processor, and exists independently.

According to an eleventh aspect, a computer program product is provided. The computer program product includes a computer program (which may also be referred to as code or instructions). When the computer program is run, a computer is enabled to perform the method according to any one of the first aspect to the third aspect or the possible implementations of the first aspect to the third aspect.

According to a twelfth aspect, a computer-readable storage medium is provided. The computer-readable storage medium stores a computer program (which may also be referred to as code or instructions). When the computer program is run on a computer, the computer is enabled to perform the method according to any one of the first aspect to the third aspect or the possible implementations of the first aspect to the third aspect.

According to a thirteenth aspect, an I2C data transmission system is provided, including a master device, the first transmission chip, the second transmission chip, and a slave device.

DETAILED DESCRIPTION

The following describes technical solutions of this application with reference to the accompanying drawings.

Figure 1:
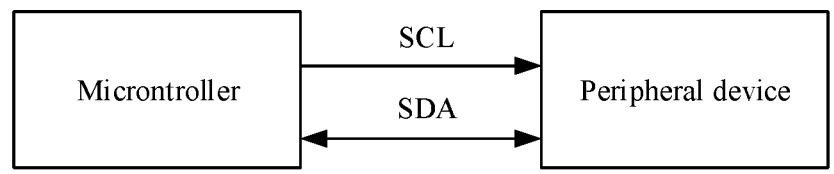
FIG. 1 is a schematic diagram of an inter-integrated circuit.

An inter-integrated circuit I2C is a low-speed serial bus, configured to connect a microcontroller such as a master device and a peripheral device such as a slave device, and is a short-distance transmission bus routed on a printed circuit board (PCB). As shown in FIG. 1, the I2C includes two lines. One line is a serial clock line (SCL), configured to transmit a clock. The SCL is unidirectional transmission, that is, only a microcontroller can transmit the clock to the peripheral device. The other line is a serial data line (SDA), configured to transmit data. The SDA is bidirectional transmission, that is, data may be transmitted from the microcontroller to the peripheral device, or may be transmitted from the peripheral device to the microcontroller.

Figure 2:
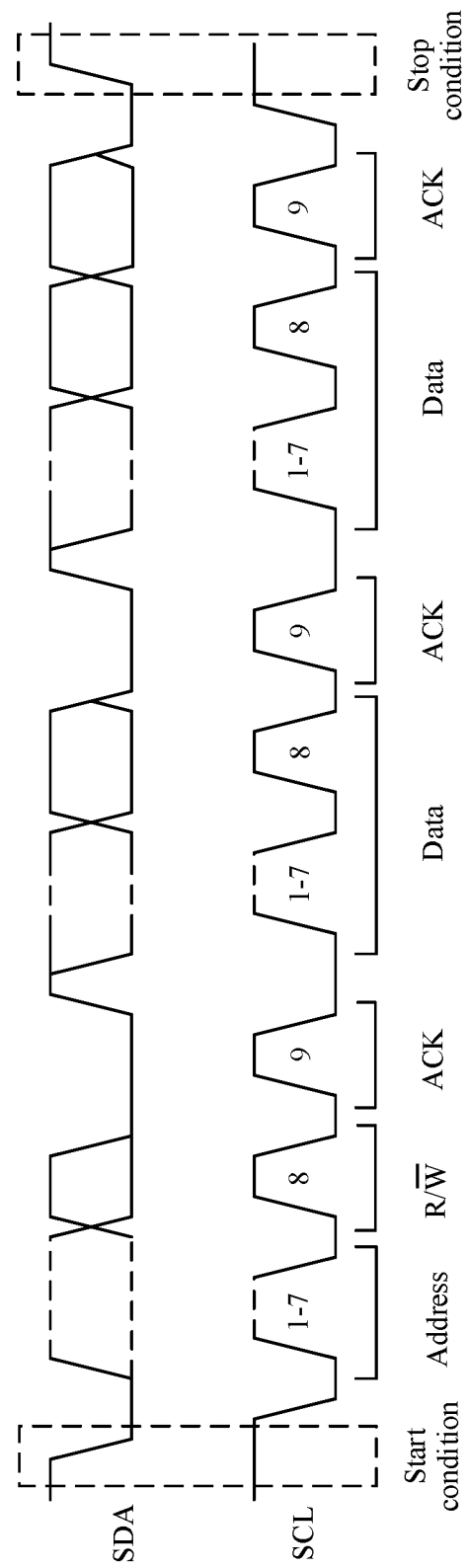
FIG. 2 is a schematic diagram of inter-integrated circuit data transmission.

The microcontroller controls a behavior of the I2C by controlling level states of the two lines. As shown in FIG. 2, when the SCL is at a high level, and the SDA changes from a high level to a low level, it indicates that data transmission starts. When the SCL is at a high level, and the SDA changes from a low level to a high level, it indicates that data transmission ends.

During I2C-based data transmission, each time of interaction fixedly includes nine bits, where eight bits represent data, and one bit represents a feedback. That is, each time a transmit end sends 8-bit data, the transmit end needs to receive a 1-bit feedback from a receive end before performing a next operation. As shown in FIG. 2, the 8-bit data sent by the transmit end to the receive end for the first time include a 7-bit receiving device address and a 1-bit read/write (R/W) selection bit. After receiving an acknowledgment (ACK) message sent by the receive end, the transmit end continues to send 8-bit data to the receive end.

Figure 3:
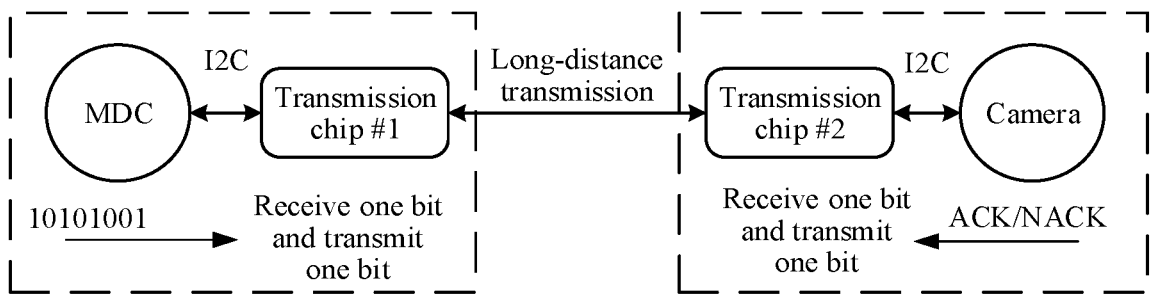
FIG. 3 and FIG. 4 are schematic diagrams of transmitting I2C data to a camera by multi-domain controller.

In a long-distance I2C data transmission scenario, a distance between a microcontroller and a peripheral device is relatively long (usually about 10 m). Therefore, I2C data needs to be transparently transmitted in a data packet based on a long-distance transmission technology. As shown in FIG. 3, in an intra-vehicle network scenario, a multi-domain controller (MDC) is used as a microcontroller, and the MDC is installed in a vehicle. As a peripheral device, a vehicle-mounted camera is usually installed on a windshield, a rear bumper, or a door post. Therefore, there is a long distance between the camera and the MDC. There is a high-speed transmission line that can be used to transmit an image between the MDC and the camera. Therefore, I2C data can be collinearly transmitted on a long-distance high-speed transmission line between the camera and the MDC.

Currently, the I2C data can be transmitted over a long distance in two manners:

Manner 1:

As shown in FIG. 3, an example in which an MDC transmits I2C data to a camera (for example, the transmitted data is 10101001). The MDC transmits 1-bit I2C data to a corresponding transmission chip #1 each time. Further, the transmission chip #1 transmits the received 1-bit I2C data to a transmission chip #2 corresponding to the camera. Further, the transmission chip #2 transmits the received 1-bit I2C data to the camera. The foregoing operations are repeated until the MDC transmits all 8-bit I2C data to the camera, and the camera feeds back a 1-bit ACK message or a 1-bit negative acknowledgment (NACK) message to the transmission chip #2. Further, the transmission chip #2 packs 1-bit feedback information, and sends the 1-bit feedback information to the transmission chip #1. Further, the transmission chip #1 feeds back the received feedback information to the MDC. The MDC sends next 8-bit I2C data only after receiving the 1-bit feedback information.

As shown in FIG. 3, I2C transmission between the transmission chip #1 and the transmission chip #2 is long-distance transmission, that is, the I2C data sent by the transmission chip #1 to the transmission chip #2 needs to be carried in a long-distance transmission data packet for transmission. Therefore, a prerequisite for transmitting the I2C data by using the foregoing method is that a transmission frequency of the long-distance transmission data packet needs to be greater than a transmission rate of the I2C data. For example, the transmission rate of the I2C data is 400 kilobits per second (Kbps). If the I2C data is transmitted according to the method in the manner 1, each time the transmission chip #1 transmits 1-bit I2C data to the transmission chip #2, the 1-bit I2C data needs to be carried in the long-distance transmission data packet. In other words, within one second, if the transmission chip #1 needs to transmit 400 kilobits of I2C data to the transmission chip #2, at least 400,000 data packets need to be transmitted between the transmission chip #1 and the transmission chips #2. Therefore, the transmission frequency of the long-distance transmission data packet needs to be greater than 400 KHz. Table 1 shows long-distance transmission rates corresponding to different I2C data transmission rates, and packet sizes for long-distance transmission, where encapsulated packet size (byte)=long–distance transmission rate/I2C data transmission rate/8. For example, 1 Gbps/400 Kbps/8-312.5 bytes. For example, the transmission rate of the I2C data is 400 Kbps, that is, at least 400,000 long-distance transmission packets need to be transmitted within one second. When the long-distance transmission rate is 1 Gbps, a size of each packet is 1 Gb/400,000/8=312.5 bytes. It should be noted that the following table is merely an example, and simplified calculation is used, that is, 1 Kbps=1,000 bps, 1 Mbps=1,000,000 bps, and 1 Gbps=1,000,000,000 bps. Other overheads such as packet headers and signaling are not considered.

TABLE 1

| I2C transmission rate | Encapsulated packet size (byte) | | | |
| --- | --- | --- | --- | --- |
| | Long-distance transmission rate | | | |
| | 1 Gbps | 2.5 Gbps | 5 Gbps | 10 Gbps |
| 400 Kbps | 312.5 | 781.25 | 1562.5 | 3125 |
| 1 Mbps | 125 | 312.5 | 625 | 1250 |

Therefore, when the I2C data is transmitted by using the foregoing method, because the transmission rate of the I2C data is coupled with the transmission frequency of the long-distance transmission data packet, a size of the long-distance transmission data packet is limited. However, each long-distance transmission data packet needs to indicate a format of transmitted data and check the data packet. Therefore, a smaller long-distance transmission data packet indicates lower transmission efficiency. In other words, when the I2C data is transmitted by using the foregoing method, the long-distance transmission rate is coupled with the transmission rate of the I2C data, thereby affecting the encapsulated packet size of the long-distance transmission, and reducing transmission efficiency of a long-distance interface.

Figure 4:
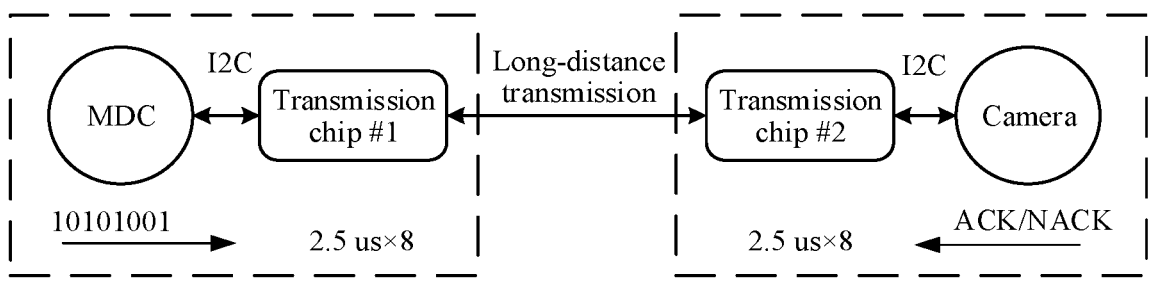

Manner 2:

As shown in FIG. 4, an example in which an MDC transmits I2C data to a camera (for example, the transmitted data is 10101001). After receiving 8-bit I2C data from the MDC, a transmission chip #1 corresponding to the MDC packs the 8-bit I2C data, and transmits the 8-bit I2C data to a transmission chip #2 corresponding to the remote camera at a time. Further, the transmission chip #2 transmits the 8-bit I2C data to the camera. After receiving the 8-bit I2C data, the camera feeds back a 1-bit ACK/NACK to the transmission chip #2. Further, the transmission chip #2 sends the received 1-bit feedback information to the transmission chip #1. The transmission chip #1 then feeds back the 1-bit feedback information to the MDC. After receiving the 1-bit feedback information, the MDC sends next 8-bit I2C data.

For example, a transmission rate of I2C data is 400 Kbps. In a short-distance transmission process of the I2C data, a time required for transmitting 8-bit data and 1-bit feedback information between a microcontroller and a peripheral device is 2.5×9 microseconds. However, in a process of performing long-distance transmission of the I2C data by using the foregoing method, it takes 2.5×8 microseconds for the MDC to transmit the 8-bit I2C data to the transmission chip #1, and 2.5×8 microseconds for the transmission chip #2 to transmit the 8-bit I2C data to the camera. In addition, it takes 2.5 microseconds for the camera to return the 1-bit feedback information to the transmission chip #2, and 2.5 microseconds for the transmission chip #1 to feed back the 1-bit feedback information from the transmission chip #2 to the MDC, and there is further a transmission delay between the transmission chip #1 and the transmission chip #2.

Therefore, the long-distance transmission of the I2C is performed by using the foregoing method, and a time of interaction between the MDC and the camera is greater than 2.5×9×2 microseconds (2.5×9×2 microseconds+transmission delay between the transmission chip #1 and the transmission chip #2). In other words, compared with the short-distance transmission of the I2C data, a transmission interaction time of the long-distance transmission of the I2C data performed in the manner 2 is more than doubled. Therefore, the long-distance transmission of the I2C data by using the foregoing method causes an effective rate of I2C data transmission to be lowered more than doubled.

Based on this, an embodiment of this application provides a data transmission method according to an I2C protocol, to improve an effective transmission rate of I2C data.

Figure 5:
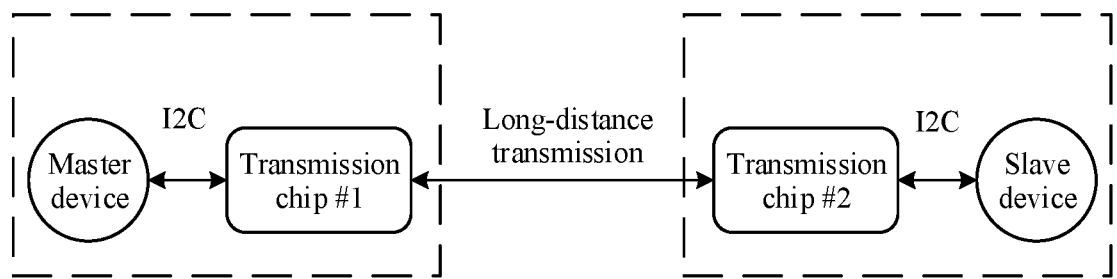
FIG. 5 to FIG. 7 are schematic diagrams of a communications system applicable to a method according to an embodiment of this application.

FIG. 5 is a schematic diagram of a communications system 100 applicable to a method according to an embodiment of this application. As shown in FIG. 5, a master device is connected to a corresponding transmission chip #1, and a slave device is connected to a corresponding transmission chip #2 through an I2C bus. That is, I2C data may be transmitted between the master device and the transmission chip #1 and between the slave device and the transmission chip #2 according to an existing I2C mechanism. The master device corresponds to the transmission chip #1 (or the transmission chip #1 corresponds to the master device). It may be understood that the master device is connected to the transmission chip #1 through the I2C bus. In some embodiments, the transmission chip #1 may be integrated in the master device, or may be independent of the master device. This is not limited in this application. The slave device corresponds to the transmission chip #2 (or the transmission chip #2 corresponds to the slave device). It may be understood that the slave device is connected to the transmission chip #2 through the I2C bus. In some embodiments, the transmission chip #2 may be integrated in the slave device, or may be independent of the slave device. This is not limited in this application.

The transmission chip #1 and the transmission chip #2 are connected through a long-distance transmission line, that is, a long-distance transmission data packet may be transmitted between the transmission chip #1 and the transmission chip #2. In addition, the I2C data transmitted between the transmission chip #1 and the transmission chip #2 may be carried in the long-distance transmission data packet for transmission.

Figure 6:
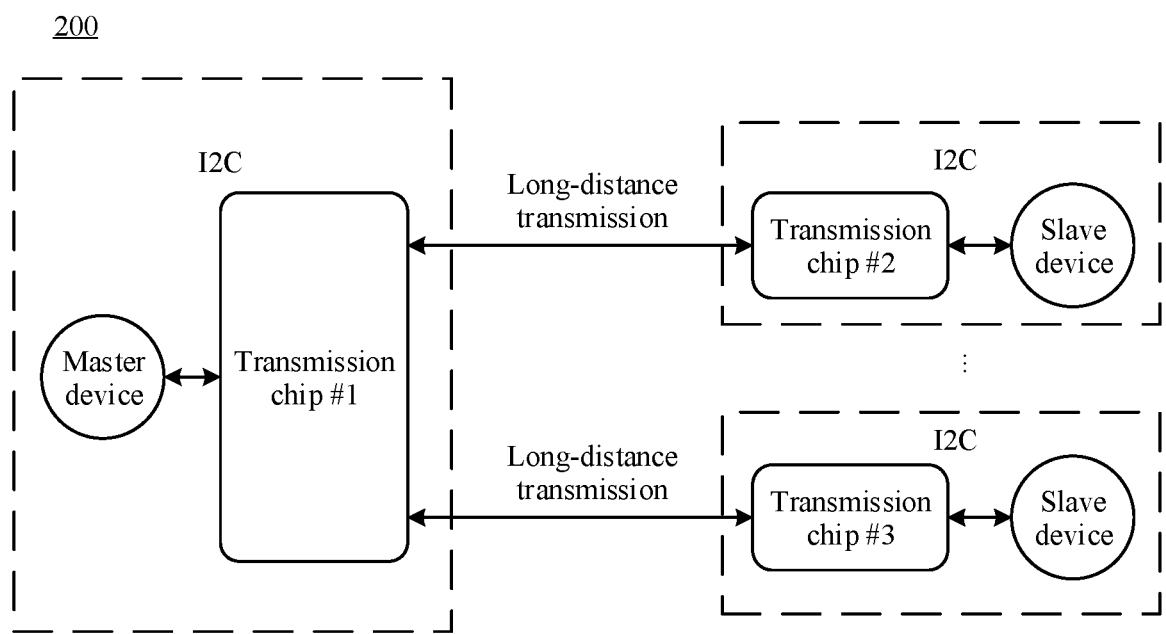

In the communications system shown in FIG. 5, a transmission chip #1 corresponding to the master device is connected to a transmission chip corresponding to only one slave device. In some scenarios, the transmission chip #1 may be connected to transmission chips corresponding to a plurality of slave devices. In a communications system 200 shown in FIG. 6, a transmission chip #1 is connected to a transmission chip #2 and a transmission chip #3. In the communications system shown in FIG. 6, only an example in which there is one I2C interface between a master device and the transmission chip #1 is shown, and there may be a plurality of I2C interfaces between the master device and the transmission chip #1. It may be understood that, when one I2C interface exists between the master device and the transmission chip #1, the master device can interact with only one slave device at a time. When there are a plurality of I2C interfaces between the slave device and the transmission chip #1, the master device may simultaneously interact with a plurality of slave devices. In this case, each I2C interface between the slave device and the transmission chip #1 corresponds to different slave devices.

Figure 7:
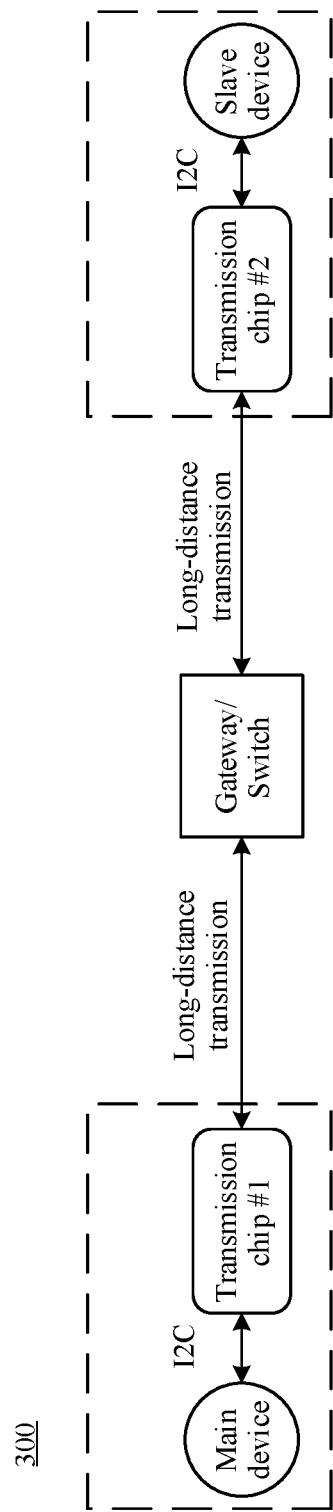

In a communications system 300 shown in FIG. 7, in some application scenarios, a transmission chip #1 corresponding to a master device may further be connected to a transmission chip #2 corresponding to a slave device by using a gateway or a switch.

The following describes in detail a data transmission method according to an I2C protocol provided in an embodiment of this application with reference to accompanying drawings.

It should be understood that the following is merely for ease of understanding and description. An example in which a first device interacts with only one second device is used for description. However, this should not constitute a limitation on the embodiments of this application.

The method provided in the embodiments of this application is also applicable to a scenario in which the first device interacts with a plurality of second devices. The first device may be a master device, and the second device may be a slave device. Alternatively, the first device may be a slave device, and the second device is a master device. In a scenario in which the first device interacts with the plurality of second devices, the first device may interact with each second device by using the method provided in the embodiments of this application.

It should be noted that storage space #1 and storage space #2 mentioned in the embodiments shown below correspond to the transmission chip #1, and the storage space #1 and the storage space #2 may correspond to a same memory in the transmission chip #1, or may correspond to different memories in the transmission chip #1. This is not limited in the embodiments of this application.

It should be further noted that storage space #3 and storage space #4 mentioned in the embodiments shown below correspond to the transmission chip #2, and the storage space #3 and the storage space #4 may correspond to a same memory in the transmission chip #2, or may correspond to different memories in the transmission chip #2. This is not limited in the embodiments of this application.

Figure 8:
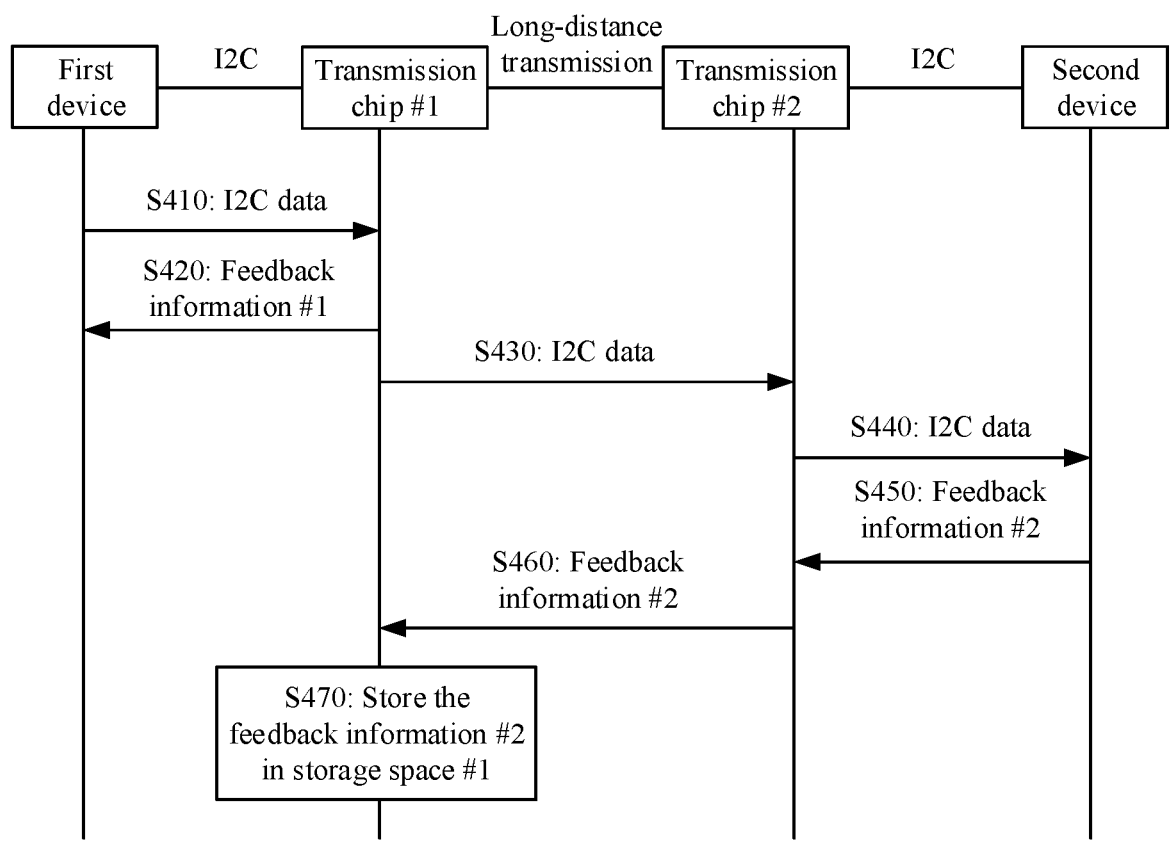
FIG. 8 to FIG. 10 are schematic flowcharts of data transmission methods according to embodiments of this application.

FIG. 8 is a schematic flowchart of a data transmission method according to an embodiment of this application. A first device and a corresponding transmission chip #1 are connected through an I2C bus, a second device and a corresponding transmission chip #2 are connected through an I2C bus, and the transmission chip #1 and the transmission chip #2 are connected through a long-distance transmission line. The method 400 shown in FIG. 8 may be applied to the communications system 100 to the communications system 300 shown in FIG. 5 to FIG. 7. The first device and the second device shown in FIG. 8 may be respectively a master device and a slave device in the communications system 100 to the communications system 300, or the first device and the second device shown in FIG. 8 may be respectively a slave device and a master device in the communications system 100 to the communications system 300. The method shown in FIG. 8 may include S410 to S470. The following describes the operations in the method 400 in detail.

S410: The first device sends I2C data to the transmission chip #1 (an example of a first transmission chip). Correspondingly, in S410, the transmission chip #1 obtains the I2C data from the first device.

The I2C data is data sent by the first device to the second device.

S420: The transmission chip #1 sends feedback information #1 (an example of first feedback information) to the first device.

The feedback information #1 is used to indicate whether the I2C data is successfully received.

That the first device sends I2C data to the transmission chip #1 may mean that the first device writes the I2C data to an address of the transmission chip #1. For example, the first device writes the I2C data to storage space #2 (an example of second storage space) corresponding to an address #2 of the transmission chip #1.

That the transmission chip #1 obtains the I2C data from the first device may mean that the transmission chip #1 reads the I2C data written by the first device to the storage space #2.

After obtaining the I2C data, the transmission chip #1 may return the feedback information #1 to the first device based on whether the I2C data is complete (for example, whether the I2C data is sufficient for eight bits). When the I2C data is complete, or when the transmission chip #1 successfully receives the I2C data, the feedback information #1 sent by the transmission chip #1 to the first device may be an ACK message. When the I2C data is not complete, or when the transmission chip #1 fails to receive the I2C data, the feedback information #1 sent by the transmission chip #1 to the first device may be a NACK message.

It may be understood that if the feedback information #1 is used to indicate that the I2C data is successfully received, the first device continues to send next I2C data to the transmission chip #1. If the feedback information #1 is used to indicate that the I2C data fails to be received, the first device retransmits, to the transmission chip #2, the I2C data corresponding to the feedback information #1. For example, after sending I2C data #1 to the transmission chip #1, if the first device receives an ACK message fed back by the transmission chip #1, the first device continues to send I2C data #2 to the transmission chip #1. If the first device receives a NACK message fed back by the transmission chip #1, the first device retransmits the I2C data #1 to the transmission chip #1.

According to an I2C transmission mechanism, after sending one piece of 8-bit I2C data, the first device can send next 8-bit I2C data only after receiving one piece of 1-bit feedback information. In this embodiment of this application, according to a solution in which the transmission chip #1 returns the 1-bit feedback information #1 to the first device based on whether the I2C data is successfully received, an effective rate for sending the I2C data by the first device is improved.

S430: The transmission chip #1 forwards the I2C data to the transmission chip #2 (an example of a second transmission chip).

It may be understood that the I2C data sent by the transmission chip #1 to the transmission chip #2 is carried in a long-distance transmission data packet.

A manner in which the transmission chip #1 forwards the I2C data to the transmission chip #2 may be: The transmission chip #1 carries the I2C data in the long-distance transmission data packet to transparently transmit the I2C data to the transmission chip #2. Alternatively, the transmission chip #1 may encapsulate the I2C data into a new data packet, and carry the new data packet in the long-distance transmission packet to transmit the I2C data to the transmission chip #2. Alternatively, the transmission chip #1 may segment and pack the I2C data into a plurality of data packets, and carry the plurality of data packets in the long-distance transmission data packet to transmit the I2C data to the transmission chip #2. Certainly, an embodiment in which the transmission chip #1 forwards the I2C data is not limited to the foregoing enumerated manner. This is not limited in this embodiment of this application.

In an implementation, each time the transmission chip #1 obtains one piece of 8-bit I2C data, the transmission chip #1 may forward obtained I2C data to the transmission chip #2.

In another implementation, after obtaining a plurality of pieces of 8-bit I2C data, the transmission chip #1 may forward the plurality of pieces of 8-bit I2C data to the transmission chip #2 at a time. For example, after an amount of I2C data stored in the storage space #2 meets a preset condition, the transmission chip #2 may forward the stored plurality of pieces of I2C data to the transmission chip #2. The preset condition may be, for example, that the amount of I2C data stored in the storage space #2 is equal to N, and N is an integer greater than 1. The preset condition may alternatively be, for example, when a time of the I2C data stored in the storage space #2 exceeds a threshold, for example, a storage time of earliest stored I2C data exceeds the threshold, or an average storage time of the plurality of pieces of stored I2C data exceeds the threshold, or a storage time of latest stored I2C data exceeds the threshold. This is not limited in this application.

A method for the transmission chip #1 to determine whether the amount of I2C data stored in the storage space #2 is equal to N is not limited in this embodiment of this application.

For example, each time obtaining one piece of I2C data, the transmission chip #1 determines an amount of I2C data stored in the storage space #2, that is, determines whether the amount of I2C data is equal to N.

In another example, the transmission chip #1 maintains a counter. Each time the transmission chip #1 obtains one piece of I2C data, a value of the counter is increased by 1. Further, the transmission chip #1 determines whether the value of the counter is equal to N. After the transmission chip #1 forwards N pieces of I2C data to the transmission chip #2, the value of the counter is cleared.

A manner in which the transmission chip #1 forwards the plurality of pieces of I2C data is not limited in this embodiment of this application.

As an example, the transmission chip #1 may generate one packet based on the plurality of pieces of I2C data (for example, arrange the plurality of pieces of I2C data in sequence to generate one data packet), carry the generated data packet in the long-distance transmission data packet, and send the data packet to the transmission chip #2.

In another example, the transmission chip #1 carries a plurality of pieces of I2C data in the long-distance transmission data packet, and sends the plurality of pieces of I2C data to the transmission chip #2.

In this embodiment of this application, after obtaining the plurality of pieces of I2C data, the transmission chip #1 forwards the plurality of pieces of I2C data to the transmission chip #2. Therefore, a transmission frequency of the long-distance transmission data packet between the transmission chip #1 and the transmission chip #2 is decoupled from a transmission rate of the I2C data, that is, the transmission frequency of the long-distance transmission data packet may be less than the transmission rate of the I2C data. Therefore, the long-distance transmission data packet may be larger, thereby improving transmission efficiency of long-distance transmission.

S440: The transmission chip #2 sends the I2C data to the second device.

If the first device is the master device, and the second device is the slave device, after receiving the I2C data from the transmission chip #1, the transmission chip #2 actively sends the received I2C data to the slave device.

If the first device is the slave device, and the second device is the master device, after receiving the I2C data from the transmission chip #1, the transmission chip #2 stores the I2C data in storage space #3 (an example of third storage space), and then waits for the master device to read the storage space #3. A method for reading the storage space #3 by the master device is described below with reference to another embodiment. Details are not described herein temporarily.

S450: The second device sends feedback information #2 (an example of second feedback information) to the transmission chip #2.

The feedback information #2 is used to indicate whether the I2C data is successfully received.

After receiving the I2C data from the transmission chip #1, the transmission chip #2 sends the I2C data to the second device according to an existing I2C procedure, that is, writes the I2C data to an address of the second device.

After receiving the I2C data from the transmission chip #2, the second device sends the feedback information #2 to the transmission chip #2 based on whether the I2C data is complete (for example, whether the I2C data is sufficient for eight bits), and whether content is complete. When the I2C data is complete and the content is correct, or when the second device successfully receives the I2C data, the feedback information #2 sent by the second device to the transmission chip #2 may be an ACK message. When the I2C data is not complete and/or the content is incorrect, or when the second device fails to receive the I2C data, the feedback information #2 sent by the second device to the transmission chip #2 may be a NACK message.

As described above, the transmission chip #1 may send the plurality of pieces of I2C data to the transmission chip #2 at a time. In this case, the transmission chip #2 may store the received plurality of pieces of I2C data in the storage space #3. Further, the transmission chip #2 sequentially sends the plurality of pieces of I2C data to the second device according to the I2C procedure. For example, the transmission chip #2 sends the I2C data #1 to the second device, and after receiving the feedback information #2 sent by the second device, the transmission chip #2 sends the I2C data #2 to the second device.

S460: The transmission chip #2 sends the feedback information #2 to the transmission chip #1.

In an embodiment, the transmission chip #2 may generate new feedback information, for example, feedback information #3 (an example of third feedback information), based on the received feedback information #2, and send the feedback information #3 to the transmission chip #1. The transmission chip #1 may obtain the feedback information #2 based on the received feedback information #3. In some embodiments, the feedback information #3 may be information in the I2C data.

Certainly, in some embodiments in which the transmission chip #2 sends the feedback information #2 is not limited to the foregoing enumerated manner. For example, the transmission chip #2 may directly send the received feedback information #2 to the transmission chip #1. In some embodiments in which the transmission chip #2 sends the feedback information #2 is not limited in this application.

It may be understood that the feedback information #3 sent by the transmission chip #2 to the transmission chip #1 is carried in the long-distance transmission data packet.

In some embodiments, each time the transmission chip #2 receives one piece of feedback information #2, the transmission chip #2 may generate one piece of feedback information #3 based on the one piece of feedback information #2, and further send the feedback information #3 to the transmission chip #1.

In some embodiments, the transmission chip #2 may send the feedback information #3 to the transmission chip #1 when a preset trigger condition is met, where the feedback information #3 is used to indicate feedback information #2 respectively corresponding to one or more pieces of I2C data. The preset trigger condition may be that an amount of feedback information #2 received by the transmission chip #2 meets a preset condition, and/or at least one of the one or more pieces of I2C data fails to be received. The preset condition may be, for example, that the amount of feedback information #2 is equal to M, and M is an integer greater than 1.

In an example, the transmission chip #2 may send the feedback information #3 to the transmission chip #1 when an amount of received feedback information #2 meets the preset condition. For example, when the amount of received feedback information #2 is equal to M, the transmission chip #2 may generate the feedback information #3 based on the M pieces of feedback information #2, and send the feedback information #3 to the transmission chip #1. The feedback information #3 is used to indicate feedback information #2 respectively corresponding to M pieces of I2C data.

In another example, the transmission chip #2 may determine, for example, based on received one or more pieces of feedback information #2, whether I2C data corresponding to each piece of feedback information #2 is successfully received, and may send the feedback information #3 to the transmission chip #1 when it is determined that at least one of the one or more pieces of I2C data fails to be received.

For example, the transmission chip #2 receives K pieces of feedback information #2, where the K pieces of feedback information #2 are respectively used to indicate that the I2C data #1 to I2C data #K are successfully received, and the transmission chip #2 sends I2C data #K+1 to the second device, and receives (K+1)th feedback information #2 fed back by the second device, where the (K+1)th feedback information #2 is used to indicate that the I2C data #K+1 fails to be received. Subsequently, the transmission chip #2 generates the feedback information #3 based on received K+1 pieces of feedback information #2, and sends the feedback information #3 to the transmission chip #1. K is an integer.

In still another example, the transmission chip #2 sends the feedback information #3 to the transmission chip #1 when the amount of received feedback information #2 meets the preset condition and it is determined that at least one of the one or more pieces of I2C data fails to be received. For example, when the amount of feedback information #2 received by the transmission chip is equal to M, and at least one piece of feedback information #2 in M pieces of feedback information #2 is used to indicate that I2C data corresponding to the feedback information #2 fails to be received, the transmission chip generates the feedback information #3 based on the M pieces of feedback information #2, and sends the feedback information #3 to the transmission chip #1.

If the amount of feedback information #2 received by the transmission chip #2 meets the preset condition, but a plurality of pieces of feedback information #2 are used to indicate that I2C data corresponding to each piece of feedback information #2 is successfully received, the transmission chip #2 may generate the feedback information #3 based on the received plurality of pieces of feedback information #2, and send the feedback information #3 to the transmission chip #1. Alternatively, after receiving feedback information #2 used to indicate that the I2C data fails to be received, the transmission chip #2 may generate the feedback information #3 based on the received feedback information #2, and send the feedback information #3 to the transmission chip #1.

As an example, a time of the feedback information #2 stored in storage space #4 by the transmission chip #2 may exceed a threshold. For example, a storage time of earliest stored feedback information #2 exceeds the threshold, or an average storage time of a plurality of pieces of stored feedback information #2 exceeds the threshold, or a storage time of latest stored feedback information #2 exceeds the threshold. This is not limited in this application. It may be understood that, when the transmission chip #2 generates the feedback information #3 based on a plurality of pieces of feedback information #2 after receiving the plurality of pieces of feedback information #2, before generating the feedback information #3, the transmission chip #2 may store the plurality of pieces of feedback information #2 in the storage space #4. After generating the feedback information #3 based on the plurality of pieces of feedback information #2, and sending the feedback information #3 to the transmission chip #1, the transmission chip #2 clears the plurality of pieces of feedback information #2 stored in the storage space #4.

A method for the transmission chip #2 to determine whether an amount of received feedback information #2 is equal to M is not limited in this embodiment of this application.

In an example, each time receiving one piece of feedback information #2, the transmission chip #2 determines an amount of feedback information #2 stored in the storage space #4, that is, determines whether the amount of feedback information #2 is equal to M.

In another example, the transmission chip #2 maintains a counter. Each time the transmission chip #2 receives one piece of feedback information #2, a value of the counter is increased by 1. Further, the transmission chip #2 determines whether the value of the counter is equal to M. After the transmission chip #2 sends the feedback information #3 to the transmission chip #1 based on the M pieces of feedback information #2, the value of the counter is cleared.

S470: The transmission chip #1 stores the feedback information #2 in storage space #1 (an example of first storage space).

In an embodiment, after receiving the feedback information #3 from the transmission chip #2, the transmission chip #1 obtains the feedback information #2 based on the feedback information #3.

In an embodiment, if the first device is the master device, and the second device is the slave device, after S470, the method may further include: The master device reads the storage space #1 of the transmission chip #1, to obtain the feedback information #2. The following describes a manner in which the master device reads the storage space #1 with reference to another embodiment. For brevity, details are not described herein.

In another embodiment, if the first device is the slave device, and the second device is the master device, after S470, the method may include: The transmission chip #1 sends the feedback information #2 to the slave device.

In this embodiment of this application, in a process in which the first device sends the I2C data to the second device, the transmission chip #1 returns one piece of feedback information (that is, the feedback information #1) to the first device based on whether the I2C data is successfully received. In this way, an I2C interface between the first device and the transmission chip #1 can be continuously used for transmission, thereby improving an effective rate of I2C data transmission. In addition, the transmission chip #2 may transmit real feedback information (that is, the feedback information #2) from the second device to the transmission chip #1. Further, the transmission chip #1 may trigger the first device to obtain the real feedback information of the second device, or send the real feedback information of the second device to the first device, so as to ensure that the first device can receive the real feedback information from the second device.

Figure 9:
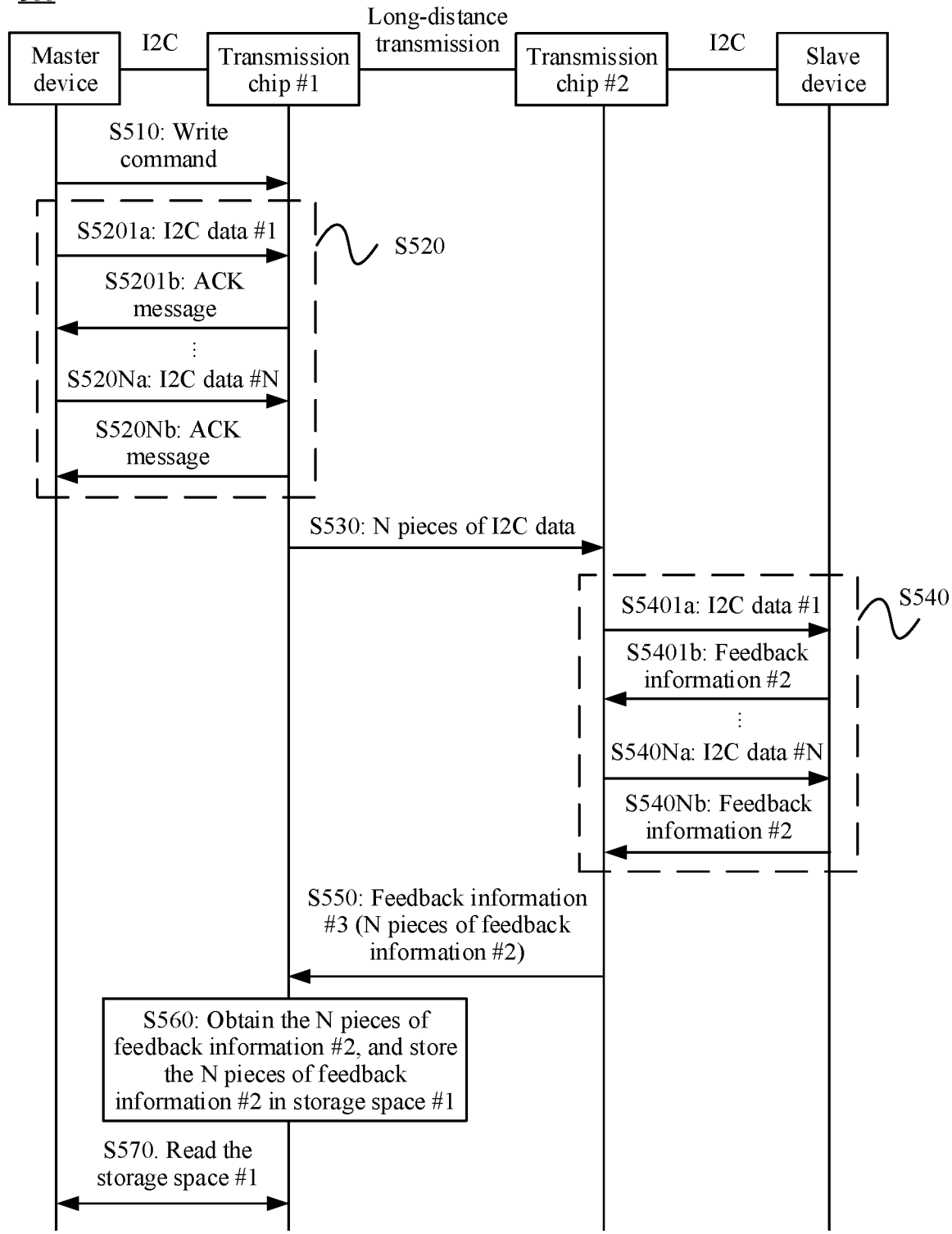

With reference to FIG. 9, the following describes the data transmission method provided in the embodiments of this application by using an example in which a first device is a master device and a second device is a slave device.

FIG. 9 is a schematic flowchart of a data transmission method according to an I2C protocol according to an embodiment of this application. The method 500 shown in FIG. 9 may include S510 to S570. The following describes the operations in detail.

S510: The master device sends a write command to a transmission chip #1 (an example of a first transmission chip).

When the master device sends the write command to the transmission chip #1, it may be understood that the master device writes the write command to an address of the transmission chip #1. For example, the master device writes the write command to storage space #2 (an example of second storage space) of the transmission chip #1.

Correspondingly, after obtaining the write command from the master device, the transmission chip #1 returns a 1-bit ACK message or a 1-bit NACK message to the master device based on whether the write command is sufficient for eight bits and whether content of the write command is correct. If the write command is sufficient for eight bits and the content is correct, the transmission chip #1 returns the ACK message to the master device. If the write command is less than eight bits, and/or content is incorrect, the transmission chip #1 returns the NACK message to the master device.

Further, if the master device receives the ACK message from the transmission chip #1, the master device starts to send I2C data to the transmission chip #1. If the master device receives the NACK message from the transmission chip #1, the master device re-initiates a data write procedure, that is, resends the write command to the transmission chip #1 until the master device receives the ACK message from the transmission chip #1, and the master device starts to send I2C data to the transmission chip #1.

S520: The master device sends the I2C data to the transmission chip #1.

The I2C data is data sent from the master device to the slave device. An example in which the master device sends N pieces of I2C data to the transmission chip #1 is used for description below, where N is a positive integer.

S5201*a*: The master device sends I2C data #1 to the transmission chip #1.

It may be understood that first I2C data (for example, the I2C data #1) sent by the master device to the slave device is a write command of the master device to an address of the slave device.

The master device sends the I2C data #1 to the transmission chip #1. It may be understood that the master device writes the I2C data into the storage space #2 of the transmission chip #1. Correspondingly, the transmission chip #1 reads the storage space #2 to obtain the I2C data #1.

S5201*b*. The transmission chip #1 sends the ACK message (an example of first feedback information) to the master device.

After obtaining the I2C data #1 from the master device, the transmission chip #1 sends 1-bit feedback information #1 (an example of the first feedback information) to the master device based on determining whether the I2C data #1 is sufficient for eight bits. For example, the feedback information #1 may be the ACK message or the NACK message. If the I2C data #1 is sufficient for eight bits, the transmission chip #1 sends the ACK message to the master device. If the I2C data #1 is less than eight bits, the transmission chip #1 sends the NACK message to the master device.

After receiving the ACK message from the transmission chip #1, the master device continues to send next I2C data to the transmission chip #1.

S520Na: The master device sends I2C data #N to the transmission chip #1.

S520Nb: The transmission chip #1 sends the ACK message to the master device.

It should be understood that FIG. 9 is described only by using an example in which the feedback information #1 returned by the transmission chip #1 to the master device is the ACK message. However, this constitutes no limitation on this embodiment of this application.

S530: The transmission chip #1 forwards the N pieces of I2C data of the master device to a transmission chip #2 (an example of a second transmission chip).

It may be understood that the N pieces of I2C data sent by the transmission chip #1 to the transmission chip #2 are carried in a long-distance transmission data packet.

When an amount of I2C data stored in the storage space #2 is equal to N, the transmission chip #1 forwards the N pieces of I2C data to the transmission chip #2 at a time. For a method for the transmission chip #1 to determine whether the amount of I2C data stored in the storage space #2 is equal to N, refer to the foregoing descriptions in S430. For brevity, details are not described herein again.

S540: The transmission chip #2 sends the I2C data to the slave device.

After receiving the N pieces of I2C data from the transmission chip #1, the transmission chip #2 may store the N pieces of I2C data in storage space #3 (an example of third storage space), and then sequentially send the N pieces of I2C data to the slave device.

S5401a: The transmission chip #2 sends the I2C data #1 to the slave device.

S5401b: The slave device sends feedback information #2 (an example of second feedback information) to the transmission chip #2.

The feedback information #2 is used to indicate whether the I2C data #1 is successfully received.

After receiving the I2C data #1 from the transmission chip #2, the slave device sends 1-bit feedback information #2 to the transmission chip #2 based on determining whether the I2C data #1 is sufficient for eight bits and whether content is correct. For example, the feedback information #2 may be an ACK message or a NACK message. If the I2C data #1 is sufficient for eight bits and the content is correct, the slave device sends the ACK message to the transmission chip #2. If the I2C data #1 has less than eight bits and/or the content is incorrect, the slave device sends the NACK message to the transmission chip #2.

After receiving the feedback information #2 from the slave device, the transmission chip #2 may store the feedback information #2 in the storage space #4, and continue to send next I2C data to the slave device.

S540Na: The transmission chip #2 sends the I2C data #N to the slave device.

S540Nb: The slave device sends the feedback information #2 to the transmission chip #2.

The feedback information #2 is used to indicate whether the I2C data #N is successfully received.

S550: The transmission chip #2 generates feedback information #3 (an example of third feedback information) based on received N pieces of feedback information #2, where the feedback information #3 is used to indicate the N pieces of feedback information #2.

It may be understood that the feedback information #3 sent by the transmission chip #2 to the transmission chip #1 is carried in the long-distance transmission data packet.

When an amount of feedback information #2 stored in the storage space #4 is equal to N, the transmission chip #2 sends the feedback information #3 to the transmission chip #1 based on the N pieces of feedback information #2. For a method for the transmission chip #2 to determine whether the amount of feedback information #2 stored in the storage space #4 is equal to N, refer to the foregoing descriptions in S460. For brevity, details are not described herein again.

It should be understood that FIG. 9 is merely an example, and shows that after the amount of feedback information #2 received by the transmission chip #2 is equal to N, the transmission chip #2 is triggered to send the feedback information #3 to the transmission chip #1. This should not constitute a limitation on this application. The transmission chip #2 may further send the feedback information #3 to the transmission chip #1 based on M pieces of feedback information #2 when the amount of received feedback information #2 is equal to M. M is a positive integer, and M is not equal to N.

In some embodiments, the transmission chip #2 may send the feedback information #3 to the transmission chip #1 when received feedback information #2 is the NACK message. In some embodiments, if the feedback information #2 received by the transmission chip #2 is all ACK messages, the transmission chip #2 does not send the feedback information #3 to the transmission chip #1. The transmission chip #2 generates the feedback information #3 based on the received feedback information #2 only after a NACK message is received, and sends the feedback information #3 to the transmission chip #1.

In some other embodiments, when the amount of feedback information #2 stored in the storage space #4 is equal to N, and at least one piece of feedback information #2 in N pieces of feedback information #2 is a NACK message, the transmission chip #2 generates the feedback information #3 based on the N pieces of feedback information #2, and sends the feedback information #3 to the transmission chip #1.

S560: The transmission chip #1 obtains the N pieces of feedback information #2 based on the received feedback information #3, and stores the feedback information #2 in storage space #1.

It may be understood that the transmission chip #2 sends the feedback information #3 to the transmission chip #1 only when at least one of received plurality of pieces of feedback information #2 is a NACK message. Therefore, before the transmission chip #1 receives the feedback information #3, messages stored in the storage space #1 (an example of first storage space) of the transmission chip #1 are all ACK messages by default. After receiving the feedback information #3, the transmission chip #1 updates the ACK message stored in the storage space #1 by default to the feedback information #2 obtained based on the feedback information #3. Further, after the master device reads the storage space #1, the transmission chip #1 restores the storage space #1 to a state in which the ACK message is stored by default.

S570: The master device reads the storage space #1 of the transmission chip #1.

A time when the master device reads the storage space #1 is not limited in this embodiment of this application.

In an embodiment, the master device may periodically read the storage space #1.

For example, the master device may set, according to a rule in which the transmission chip #1 sends the I2C data to the transmission chip #2, a period of reading the storage space #1. For example, each time receiving the N pieces of I2C data from the master device, the transmission chip #1 sends the N pieces of I2C data to the transmission chip #2 at a time. In this case, the master device may read the storage space #1 once each time sending 2N pieces of I2C data, or may read the storage space #1 once each time sending 3N pieces of I2C data.

In another embodiment, the master device may read the storage space #1 when determining that the storage space #2 is in a write-inhibit state.

After the transmission chip #1 receives the feedback information #3 from the transmission chip #2, if the master device continues writing the I2C data into the storage space #2 of the transmission chip #1, the storage space #2 of the transmission chip #1 stops receiving the I2C data. That is, the storage space #2 is set to a receive-disabled state. When the storage space #2 of the transmission chip #1 stops receiving the I2C data, the transmission chip #1 feeds back a NACK message to the master device. Correspondingly, after receiving the NACK message fed back by the transmission chip #1, the master device determines that the storage space #2 is in the write-inhibit state. Further, the master device reads the storage space #1.

If the feedback information #2 obtained by the master device by reading the storage space #1 is all ACK messages, that is, the feedback information #2 is used to indicate that the I2C data is successfully received, the master device determines that an error occurs on an I2C link between the master device and the transmission chip #1. If at least one piece of feedback information #2 obtained by the master device by reading the storage space #1 is a NACK message, that is, the at least one piece of feedback information is used to indicate that the I2C data fails to be received, the master device determines that an error occurs on an I2C link between the transmission chip #2 and the slave device. Further, after determining a location of a link error, the master device retransmits corresponding I2C data according to a preset rule.

If all I2C data sent by the master device to the slave device is sent, but it is not determined whether last I2C data is successfully received, the master device may periodically read the storage space #1.

It should be understood that, in this embodiment of this application, the master device may determine that after sending 8-bit I2C data, received feedback information #1 is returned by the transmission chip #1. The feedback information #2 obtained by the master device by reading the storage space #1 of the transmission chip #1 is real feedback information of the device.

If one piece of feedback information #2 obtained by the master device by reading the storage space #1 is an ACK message, it is determined that the slave device successfully receives the I2C data corresponding to the feedback information #2. If one piece of feedback information #2 obtained by the master device by reading the storage space #1 is a NACK message, it is determined that the slave device fails to receive the I2C data corresponding to the feedback information #2, and then the master device retransmits the I2C data corresponding to the feedback information #2 to the slave device.

In an embodiment of this application, in a process in which the master device writes data to the slave device, the transmission chip #1 returns one piece of feedback information (that is, the feedback information #1) to the master device based on whether the I2C data is successfully received. In this way, an I2C interface between the master device and the transmission chip #1 can be continuously used for transmission, thereby improving an effective rate of I2C data transmission. In addition, the transmission chip #2 may transmit the real feedback information (that is, the feedback information #2) of the slave device to the transmission chip #1. Further, the transmission chip #1 may trigger the master device to obtain the real feedback information of the slave device, so as to ensure that the master device can receive the real feedback information from the slave device.

Figure 10:
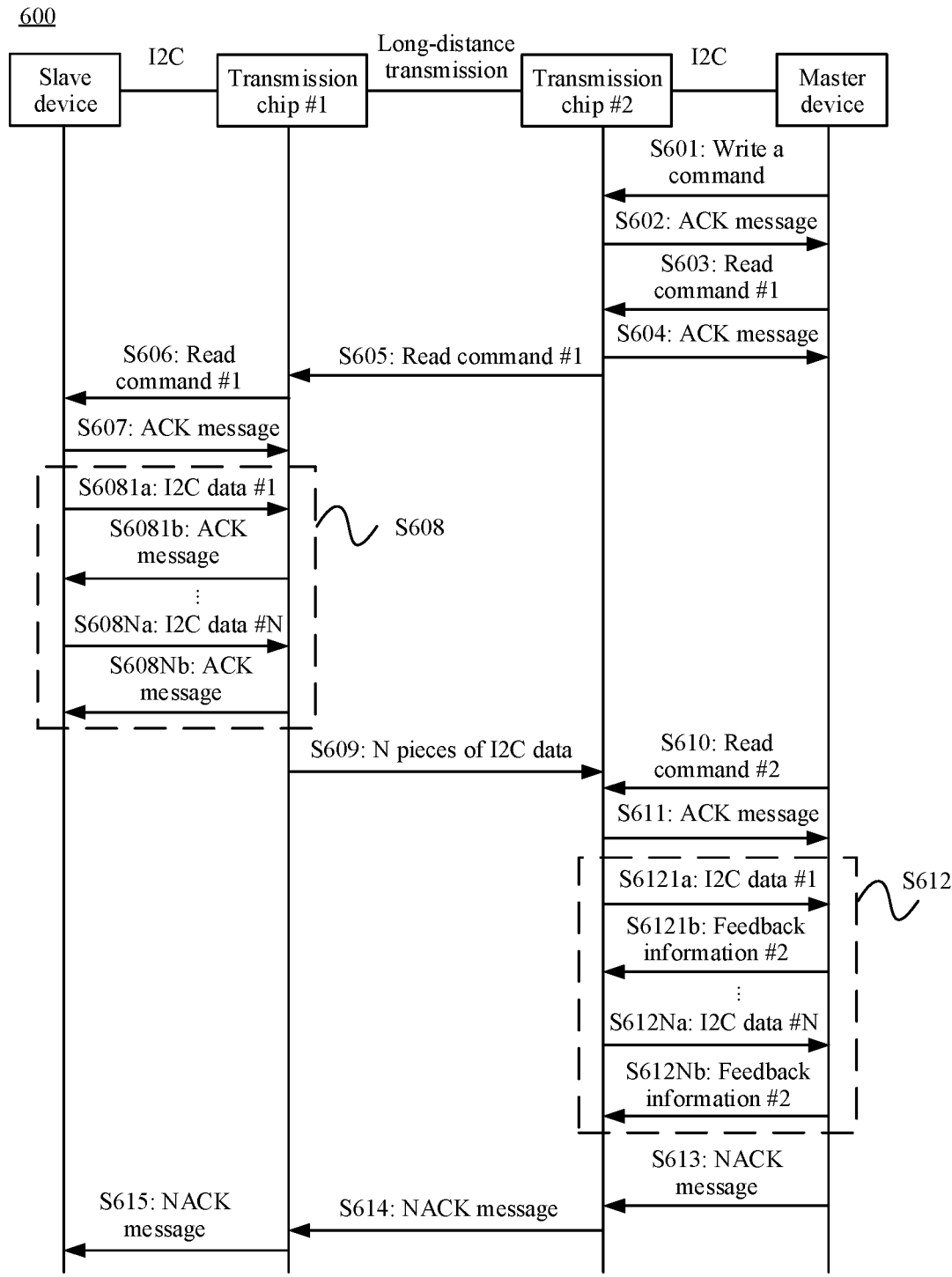

With reference to FIG. 10, the following describes the data transmission method provided in the embodiments of this application by using an example in which a first device is a slave device and a second device is a master device.

FIG. 10 is a schematic flowchart of a data transmission method according to an I2C protocol according to an embodiment of this application. The method 600 shown in FIG. 10 may include S601 to S615. The following describes the operations in detail.

S601: The master device sends a write command to a transmission chip #2 (an example of a second transmission chip).

When the master device sends the write command to the transmission chip #2, it may be understood that the master device writes the write command to an address of the transmission chip #2. For example, the master device writes the write command to storage space #3 (an example of third storage space) of the transmission chip #2.

S602: The transmission chip #2 sends an ACK message to the master device.

After obtaining the write command from the master device, the transmission chip #2 returns a 1-bit ACK message or a 1-bit NACK message to the master device based on whether the write command is sufficient for eight bits and whether content of the write command is correct. If the write command is sufficient for eight bits and the content is correct, the transmission chip #2 returns the ACK message to the master device. If the write command is less than eight bits, and/or content is incorrect, the transmission chip #2 returns the NACK message to the master device.

Further, if the master device receives the ACK message from the transmission chip #2, the master device starts to perform a next operation. If the master device receives a NACK message from the transmission chip #2, the master device resends the write command, that is, resends the write command to the transmission chip #2 until the master device receives the ACK message from the transmission chip #2, and the master device starts to perform a next operation.

S603: The master device sends a read command #1 to the transmission chip #2.

It may be understood that the master device writes the read command #1 to the storage space #3 of the transmission chip #2. The read command #1 indicates an address and a read flag that are of the slave device and that are to be read by the master device.

S604: The transmission chip #2 sends the ACK message to the master device.

After obtaining the read command #1 from the master device, the transmission chip #2 returns a 1-bit ACK message or a 1-bit NACK message to the master device based on whether the read command #1 is sufficient for eight bits. If the write command is sufficient for eight bits, the transmission chip #2 returns the ACK message to the master device. If the write command is less than eight bits, the transmission chip #2 returns the NACK message to the master device.

S605: The transmission chip #2 forwards the read command #1 to a transmission chip #1 (an example of a first transmission chip).

It may be understood that the read command #1 forwarded by the transmission chip #2 to the transmission chip #1 is carried in a long-distance transmission data packet.

After obtaining the read command #1, the transmission chip #2 may determine that the master device initiates a read operation, and then forwards the read command #1 to the transmission chip #1.

S606: The transmission chip #1 sends the read command #1 to the slave device.

S607: The slave device sends an ACK message to the transmission chip #1.

After receiving the read command #1 from the transmission chip #1, the slave device returns a 1-bit ACK message or a 1-bit NACK message to the transmission chip #1 based on whether the read command #1 is sufficient for eight bits and whether content is correct.

If the read command #1 is sufficient for eight bits and the content is correct, the slave device returns the ACK message to the transmission chip #1, and then the slave device starts to transmit I2C data to the transmission chip #1.

If the read command #1 is less than eight bits, and/or the content is incorrect, the slave device returns the NACK message to the transmission chip #1. Further, after receiving the NACK message sent by the slave device, the transmission chip #1 forwards the NACK message to the transmission chip #2. Further, after receiving the NACK message from the transmission chip #1, the transmission chip #2 triggers the master device to read the storage space #3 of the transmission chip #2. In this case, because the transmission chip #2 has not received the I2C data from the transmission chip #1, that is, there is no I2C data in the storage space #3, the transmission chip #2 feeds back the NACK message to the master device. Further, the master device may determine, based on the NACK message fed back by the transmission chip #2, that an I2C error occurs between the transmission chip #1 and the slave device. Therefore, the master device re-initiates the read operation to the slave device.

In an embodiment of this application, the transmission chip #2 forwards the NACK message that is of the slave device and that corresponds to the read command #1 to the transmission chip #1, and further, the transmission chip #1 feeds back the NACK message to the master device when the master device reads the storage space #3. In this way, the master device can obtain real feedback information of the slave device corresponding to the read command #1.

S608: The slave device sends the I2C data to the transmission chip #1.

The slave device sends, to the transmission chip #1, I2C data in storage space corresponding to an address indicated by the read command #1. The I2C data is data sent by the slave device to the master device. An example in which the slave device sends N pieces of I2C data to the transmission chip #1 is used for description below, where N is a positive integer.

S6081a: The slave device sends I2C data #1 to the transmission chip #1.

S6081b: The transmission chip #1 sends an ACK message to the slave device.

After receiving the I2C data #1 from the slave device, the transmission chip #1 sends 1-bit feedback information #1 (an example of first feedback information) to the slave device based on determining whether the I2C data #1 is sufficient for eight bits. For example, the feedback information #1 may be an ACK message or a NACK message.

If the transmission chip #1 determines that the I2C data is less than eight bits, that is, an error occurs in reading the data of the slave device, the transmission chip #1 sends the NACK message to the slave device. In this case, the transmission chip #1 may determine that an error occurs on an I2C link between the transmission chip #1 and the slave device, and then, the transmission chip #1 re-initiates a read process to the slave device, that is, resends the read command #1 to the slave device. Further, after receiving the ACK message corresponding to the read command #1 of the slave device, the transmission chip #1 continues reading the data of the slave device.

If the I2C data #1 is sufficient for eight bits, the transmission chip #1 sends the ACK message to the slave device. After receiving the ACK message from the transmission chip #1, the slave device continues to send next I2C data to the transmission chip #1.

S608Na: The slave device sends I2C data #N to the transmission chip #1.

S608Nb: The transmission chip #1 sends the ACK message to the slave device.

It should be understood that FIG. 10 is described only by using an example in which the feedback information #1 returned by the transmission chip #1 to the slave device is the ACK message. However, this constitutes no limitation on this embodiment of this application.

S609: The transmission chip #1 forwards the N pieces of I2C data of the slave device to the transmission chip #2.

It may be understood that the N pieces of I2C data sent by the transmission chip #1 to the transmission chip #2 are carried in a long-distance transmission data packet.

When an amount of I2C data stored in storage space 2 (an example of second storage space) is equal to N, the transmission chip #1 forwards the N pieces of I2C data to the transmission chip #2 at a time. For a method for the transmission chip #1 to determine whether the amount of I2C data stored in the storage space #2 is equal to N, refer to the foregoing descriptions in S430. For brevity, details are not described herein again.

Correspondingly, after receiving the I2C data from the transmission chip #1, the transmission chip #2 stores the I2C data in the storage space #3, and then waits for the master device to read the I2C data.

S610: The master device sends a read command #2 to the transmission chip #2.

Before starting to read the storage space #3 of the transmission chip #2, the master device may first send the read command #2 to the transmission chip #2, where the read command #2 is used to indicate an address and a read flag of the storage space #3.

A time when the master device reads the storage space #3 is not limited in this embodiment of this application.

In an embodiment, the master device may periodically read the storage space #3.

For example, the master device may set, according to a rule in which the transmission chip #1 sends the I2C data to the transmission chip #2, a period of reading the storage space #3. For example, each time the transmission chip #1 receives the N pieces of I2C data from the slave device, the transmission chip #1 sends the N pieces of I2C data to the transmission chip #2 at a time. In this case, the master device may read the storage space #3 at an interval of sending 2N pieces of I2C data, or may read the storage space #3 at an interval of sending 3N pieces of I2C data.

In another embodiment, the master device may read the storage space #3 after the transmission chip #2 releases an SCL.

In this case, the transmission chip #2 pulls the SCL low to a low state before receiving the I2C data from the transmission chip #1. After receiving the I2C data from the transmission chip #1, the transmission chip #2 releases the SCL.

S611: The transmission chip #2 sends an ACK message to the master device.

After obtaining the read command #2 from the master device, the transmission chip #2 returns a 1-bit ACK message or a 1-bit NACK message to the master device based on whether the read command #2 is sufficient for eight bits and whether content of the read command #2 is correct. If the read command #2 is sufficient for eight bits and the content is correct, the transmission chip #2 returns the ACK message to the master device. If the read command #2 is less than eight bits, and/or the content is incorrect, the transmission chip #2 returns the NACK message to the master device.

Further, if the master device receives the ACK message from the transmission chip #2, the master device starts to read the storage space #3 of the transmission chip #2. If the master device receives the NACK message from the transmission chip #2, the master device resends the read command #2 to the transmission chip #2, until the master device receives the ACK message from the transmission chip #2, and starts to read the storage space #3 of the transmission chip #2.

S612: The master device reads the storage space #3 of the transmission chip #2.

The master device sequentially reads the N pieces of I2C data stored in the storage space #3.

S6121a: The master device reads I2C data #1.

S6121b: The master device sends feedback information #2 (an example of second feedback information) to the transmission chip #2.

The feedback information #2 is used to indicate whether the I2C data #1 is successfully received.

After reading the I2C data #1 from the transmission chip #2, the master device sends 1-bit feedback information #2 to the transmission chip #2 based on determining whether the I2C data #1 is sufficient for eight bits and whether content is correct. For example, the feedback information #2 may be an ACK message or a NACK message. If the I2C data #1 is sufficient for eight bits and the content is correct, the master device sends the ACK message to the transmission chip #2. If the I2C data #1 has less than eight bits, and/or the content is incorrect, the master device sends the NACK message to the transmission chip #2.

After receiving the feedback information #2 from the slave device, the transmission chip #2 may store the feedback information #2 in storage space #4.

S612Na: The master device reads the I2C data #N.

S612Nb: The master device sends the feedback information #2 to the transmission chip #2.

The feedback information #2 is used to indicate whether the I2C data #N is successfully received.

In some embodiments, the transmission chip #2 may generate feedback information #3 (an example of third feedback information) based on received N pieces of feedback information #2, and send the feedback information #3 to the transmission chip #1, where the feedback information #3 is used to indicate the N pieces of feedback information #2. Further, after obtaining the feedback information #2 based on the feedback information #3, the feedback information #1 sends the feedback information #2 to the slave device. For a manner in which the transmission chip #2 sends the feedback information #3 to the transmission chip #1, refer to the foregoing descriptions of S550. For brevity, details are not described herein again.

S613: The master device sends a NACK message to the transmission chip #2 when stopping the read operation.

S614: The transmission chip #2 forwards the NACK message of the master device to the transmission chip #1.

It may be understood that the NACK message sent by the transmission chip #2 to the transmission chip #1 is carried in the long-distance transmission data packet.

Correspondingly, after receiving the NACK message from the transmission chip #2, the transmission chip #1 clears the I2C data stored in the storage space #2.

S615: The transmission chip #1 sends the NACK message from the transmission chip #2 to the slave device.

In an embodiment of this application, in a process in which the master device reads the data of the slave device, the transmission chip #1 returns one piece of feedback information (that is, the feedback information #1) to the slave device based on whether the I2C data is successfully received. In this way, an I2C interface between the slave device and the transmission chip #1 can be continuously used for transmission, thereby improving an effective rate of I2C data transmission.

The foregoing describes in detail the data transmission method according to an I2C protocol provided in an embodiment of this application with reference to FIG. 8 to FIG. 10. An apparatus provided in the embodiments of this application is described in detail below with reference to FIG. 11 to FIG. 14.

Figure 11:
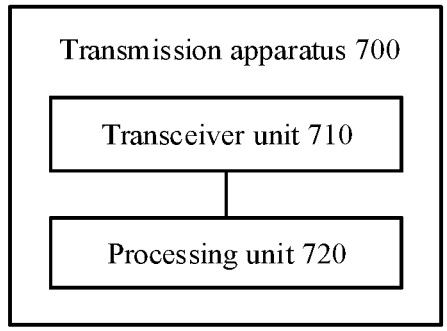
FIG. 11 and FIG. 12 are schematic block diagrams of transmission apparatuses according to embodiments of this application.

FIG. 11 is a schematic block diagram of a transmission apparatus 700 according to an embodiment of this application. As shown in the figure, the transmission apparatus 700 may include a transceiver unit 710 and a processing unit 720.

In some embodiments, the transmission apparatus 700 may correspond to the first transmission chip in the foregoing method embodiments.

It should be understood that the transmission apparatus 700 may include units configured to perform methods performed by the first transmission chip in the method 400 in FIG. 8, the method 500 in FIG. 9, and the method 600 in FIG. 10. In addition, the units in the transmission apparatus 700 and the foregoing other operations and/or functions are respectively used to implement corresponding procedures performed by the first transmission chip in the method 400 in FIG. 8, the method 500 in FIG. 9, and the method 600 in FIG. 10. It should be understood that a process of performing a corresponding operation by each unit has been described in detail in the foregoing method embodiments. For brevity, details are not described herein.

In some embodiments, the transmission apparatus 700 may correspond to the second transmission chip in the foregoing method embodiments.

It should be understood that the transmission apparatus 700 may include units configured to perform methods performed by the second transmission chip in the method 400 in FIG. 8, the method 500 in FIG. 9, and the method 600 in FIG. 10. In addition, the units in the transmission apparatus 700 and the foregoing other operations and/or functions are respectively used to implement corresponding procedures performed by the second transmission chip in the method 400 in FIG. 8, the method 500 in FIG. 9, and the method 600 in FIG. 10. It should be understood that a process of performing a corresponding operation by each unit has been described in detail in the foregoing method embodiments. For brevity, details are not described herein.

Figure 12:
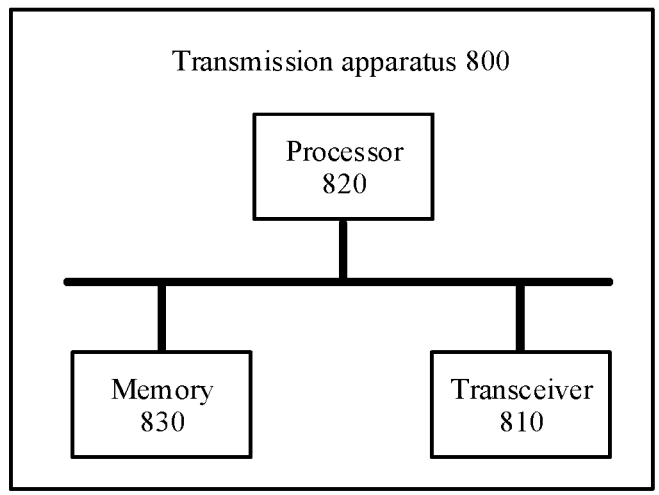

It should be understood that the transceiver unit 710 in the transmission apparatus 700 may correspond to a transceiver 810 in a transmission apparatus 800 shown in FIG. 12, and the processing unit 720 in the transmission apparatus 700 may correspond to a processor 820 in the transmission apparatus 800 shown in FIG. 12.

FIG. 12 is a schematic block diagram of the transmission apparatus 800 according to an embodiment of this application. As shown in the figure, the transmission apparatus 800 may include the processor 820, and may further include the transceiver 810 and a memory 830. The processor 820 is coupled to the memory 830, and is configured to execute instructions stored in the memory, to control the transceiver 810 to send and/or receive a signal.

It should be understood that the processor 820 and the memory 830 may be integrated into one processing apparatus. The processor 820 is configured to execute program code stored in the memory 830 to implement the foregoing functions. In some embodiments, the memory 830 may alternatively be integrated into the processor 820, or may be independent of the processor 820.

In some embodiments, the transmission apparatus 800 may correspond to the first transmission chip in the foregoing method embodiments.

In some embodiments, the transmission apparatus 800 may include units configured to perform methods performed by the first transmission chip in the method 400 in FIG. 8, the method 500 in FIG. 9, and the method 600 in FIG. 10. In addition, the units in the transmission apparatus 800 and the foregoing other operations and/or functions are respectively used to implement corresponding procedures performed by the first transmission chip in the method 400 in FIG. 8, the method 500 in FIG. 9, and the method 600 in FIG. 10. It should be understood that a process of performing a corresponding operation by each unit has been described in detail in the foregoing method embodiments. For brevity, details are not described herein.

In some embodiments, the transmission apparatus 800 may correspond to the second transmission chip in the foregoing method embodiments.

In some embodiments, the transmission apparatus 800 may include units configured to perform methods performed by the second transmission chip in the method 400 in FIG. 8, the method 500 in FIG. 9, and the method 600 in FIG. 10. In addition, the units in the transmission apparatus 800 and the foregoing other operations and/or functions are respectively used to implement corresponding procedures performed by the second transmission chip in the method 400 in FIG. 8, the method 500 in FIG. 9, and the method 600 in FIG. 10. It should be understood that a process of performing a corresponding operation by each unit has been described in detail in the foregoing method embodiments. For brevity, details are not described herein.

Figure 13:
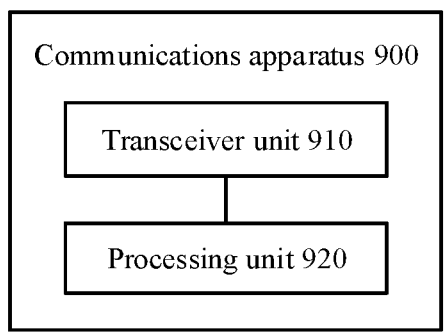
FIG. 13 and FIG. 14 are schematic block diagrams of communications apparatuses according to embodiments of this application.

FIG. 13 is a schematic block diagram of a communications apparatus 900 according to an embodiment of this application. As shown in the figure, the communications apparatus 900 may include a transceiver unit 910 and a processing unit 920.

In some embodiments, the communications apparatus 900 may include units configured to perform methods performed by the master device in the method 400 in FIG. 8, the method 500 in FIG. 9, and the method 600 in FIG. 10. In addition, the units in the communications apparatus 900 and the foregoing other operations and/or functions are respectively used to implement corresponding procedures performed by the master device in the method 400 in FIG. 8, the method 500 in FIG. 9, and the method 600 in FIG. 10. It should be understood that a process of performing a corresponding operation by each unit has been described in detail in the foregoing method embodiments. For brevity, details are not described herein. It should be understood that the transceiver unit 910 in the communications apparatus 900 may correspond to a transceiver 1010 in a communications apparatus 1000 shown in FIG. 14, and the processing unit 920 in the communications apparatus 900 may correspond to a processor 1020 in the communications apparatus 1000 shown in FIG. 14.

Figure 14:
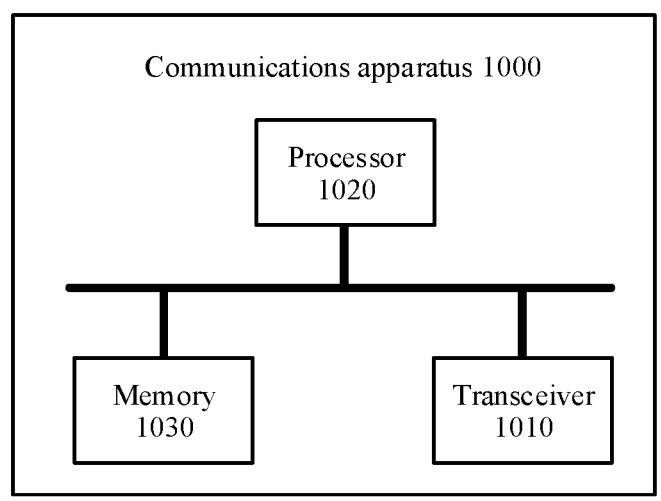

FIG. 14 is a schematic block diagram of the communications apparatus 1000 according to an embodiment of this application. As shown in the figure, the communications apparatus 1000 includes the processor 1020, and may further include the transceiver 1010. In some embodiments, the communications apparatus 1000 further includes a memory 1030, configured to store instructions. The processor 1020 is coupled to the memory 1030, and is configured to execute the instructions stored in the memory 1030, to control the transceiver 1010 to send a signal and/or receive a signal.

It should be understood that the processor 1020 and the memory 1030 may be integrated into one processing apparatus. The processor 1020 is configured to execute program code stored in the memory 1030 to implement the foregoing functions. In some embodiments, the memory 1030 may alternatively be integrated into the processor 1020, or may be independent of the processor 1020.

It should be further understood that the transceiver 1010 may include a receiver (also referred to as a receive machine) and a transmitter (also referred to as a transmit machine). The transceiver may further include an antenna, and there may be one or more antennas.

In some embodiments, the communications apparatus 1000 may include units configured to perform methods performed by the master device in the method 400 in FIG. 8, the method 500 in FIG. 9, and the method 600 in FIG. 10. In addition, the units in the communications apparatus 1000 and the foregoing other operations and/or functions are respectively used to implement corresponding procedures performed by the master device in the method 400 in FIG. 8, the method 500 in FIG. 9, and the method 600 in FIG. 10. It should be understood that a process of performing a corresponding operation by each unit has been described in detail in the foregoing method embodiments. For brevity, details are not described herein.

According to the method provided in the embodiments of this application, this application further provides a computer program product. The computer program product includes computer program code. When the computer program code is run on a computer, the computer is enabled to perform the method in any one of the embodiments shown in FIG. 8 to FIG. 10.

According to the method provided in the embodiments of this application, this application further provides a computer-readable medium. The computer-readable medium stores program code. When the program code is run on a computer, the computer is enabled to perform the method in any one of the embodiments shown in FIG. 8 to FIG. 10.

According to the method provided in the embodiments of this application, this application further provides a system. The system includes a master device, the foregoing first transmission chip, the second transmission chip, and the slave device.

All or some of the foregoing embodiments may be implemented by using software, hardware, firmware, or any combination thereof in the foregoing embodiments. When being implemented by using the software, all or some of the embodiments may be implemented in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD), a semiconductor medium (for example, a solid-state drive (SSD)), or the like.

The network elements in the foregoing apparatus embodiments may totally correspond to the network elements in the method embodiments. A corresponding unit performs a corresponding operation. For example, a transceiver unit (transceiver) performs a receiving operation or a sending operation in the method embodiments, and a processing unit (processor) may perform another operation other than the sending operation and the receiving operation. For a function of a unit, refer to a corresponding method embodiment. There may be one or more processors.

It should be understood that "one embodiment" or "an embodiment" mentioned in the entire specification does not mean that particular features, structures, or characteristics related to the embodiment are included in at least one embodiment of this application. Therefore, "in one embodiment" or "in an embodiment" throughout the entire specification does not necessarily refer to a same embodiment. In addition, these particular features, structures, or characteristics may be combined in one or more embodiments in any appropriate manner. It should be understood that, in the embodiments of this application, sequence numbers of the foregoing processes do not mean execution sequences. The execution sequences of the processes should be determined based on functions and internal logic of the processes, and should not be construed as any limitation on the implementation processes of the embodiments of the present disclosure.

The terms such as "unit", and "system" used in this specification are used to indicate computer-related entities, hardware, firmware, combinations of hardware and software, software, or software being executed. For example, a component may be but is not limited to a process that runs on a processor, a processor, an object, an executable file, an execution thread, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. The components may communicate, by using a local and/or remote process and based on, for example, a signal having one or more data packets (for example, data from two components interacting with another component in a local system, in a distributed system, and/or across a network such as the Internet interacting with another system by using the signal).

A person of ordinary skill in the art may be aware that units, methods, and operations in the examples described with reference to the embodiments disclosed in this specification can be implemented by electronic hardware or a combination of computer software and electronic hardware. Whether the functions are performed by hardware or software depends on a particular application and a design constraint of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed operating processes of the foregoing system, apparatus, and unit, refer to corresponding processes in the foregoing method embodiments, and details are not described herein again.

In some embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical, mechanical, or other forms.

The foregoing units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the operations of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A transmission apparatus, corresponding to a first device, comprising:
    a transceiver configured to:
        obtain first inter-integrated circuit (I2C) data generated by the first device, wherein the first I2C data is data sent by the first device to a second device;
        in response to obtaining, at the transceiver, the first I2C data generated by the first device and adhering to an I2C protocol, send first feedback information from the transceiver to the first device, wherein the first feedback information is used to indicate whether the first I2C data is successfully received;
        obtain at least one second I2C data generated by the first device, wherein the at least one second I2C data is data sent by the first device to the second device;
        in response to obtaining, at the transceiver, the at least one second I2C data, send another feedback information from the transceiver to the first device, wherein the another feedback information is used to indicate whether the at least one second I2C data is successfully received;
        subsequent to obtaining both the first I2C data and the at least one second I2C data, forward both the first I2C data and the at least one second I2C data to a second transmission chip corresponding to the second device; and
        receive second feedback information from the second transmission chip, wherein the second feedback information is used to indicate whether the first I2C data and the at least one second I2C data are successfully received at the second device; and
    a processor configured to store the second feedback information in first storage space, wherein the first storage space is storage space of the transmission apparatus.

2. The transmission apparatus according to claim 1, wherein after an amount of I2C data, comprising the first I2C data and the at least one second I2C data, is stored in a second storage space that meets a preset condition, the transceiver is configured to forward the stored I2C data to the second transmission chip, wherein the second storage space is storage space of the transmission apparatus, and the stored I2C data is from the first device.

3. The transmission apparatus according to claim 1, wherein the transceiver is configured to receive third feedback information from the second transmission chip, wherein the third feedback information is used to indicate the second feedback information respectively corresponding to one or more pieces of I2C data comprising the first I2C data and the at least one second I2C data.

4. The transmission apparatus according to claim 2, wherein after the transceiver receives the second feedback information from the second transmission chip, the processor is further configured to set the second storage space to a write-inhibit state.

5. The transmission apparatus according to claim 2, wherein the transceiver is configured to read the I2C data stored in the second storage space.

6. The transmission apparatus according to claim 1, wherein the first device is a master device and the second device is a slave device, or the first device is a slave device and the second device is a master device.

7. A transmission apparatus, corresponding to a second device, comprising:
    a processor; and
    a transceiver configured to:
        receive inter-integrated circuit (I2C) data, comprising first I2C data and at least one second I2C data, from a first transmission chip corresponding to a first device that generated the first device via an I2C protocol, wherein the first transmission chip is enabled to send first feedback information to the first device in response to the first transmission chip receiving the first I2C data from the first device, and send another feedback information to the first device in response to the first transmission chip receiving the first I2C data from the first device;
        send the first I2C data and the at least one second I2C data to the second device;
        receive second feedback information from the second device, wherein the second feedback information is used to indicate whether the first I2C data and the at least one second I2C data are successfully received at the second device; and
        send the second feedback information to the first transmission chip.

8. The transmission apparatus according to claim 7, wherein the transceiver is configured to send third feedback information to the first transmission chip, wherein the third feedback information is used to indicate the second feedback information respectively corresponding to one or more pieces of I2C data comprising the first I2C data and the at least one second I2C data.

9. The transmission apparatus according to claim 8, wherein the transceiver is configured to send the third feedback information to the first transmission chip when a preset trigger condition is met, wherein:
    the preset trigger condition is that an amount of the second feedback information meets a preset condition; and/or
    the preset trigger condition is that at least one piece of the I2C data fails to be received.

10. The transmission apparatus according to claim 7, wherein the processor is configured to store the first I2C data and the at least one second I2C data from the first transmission chip in third storage space, wherein the third storage space is storage space of the transmission apparatus.

11. The transmission apparatus according to claim 7, wherein the first device is a master device and the second device is a slave device, or the first device is a slave device and the second device is a master device.

12. A communications apparatus, comprising:
a processor; and
a transceiver configured to:
- send first inter-integrated circuit (I2C) data via an I2C protocol to a first transmission chip corresponding to the communications apparatus;
- receive first feedback information from the first transmission chip, wherein the first feedback information is used to indicate whether the first I2C data is successfully received, and wherein the first transmission chip is enabled to send the first feedback information in response to receiving the first I2C data;
- send at least one second I2C data via the I2C protocol to the first transmission chip corresponding to the communications apparatus;
- receive another feedback information from the first transmission chip, wherein the another feedback information is used to indicate whether the at least one second I2C data is successfully received, and wherein the first transmission chip is enabled to send the another feedback information in response to receiving the at least one second I2C data; and
- read first storage space corresponding to the first transmission chip to obtain second feedback information, wherein the second feedback information is used to indicate whether the first I2C data and the at least one second I2C data are successfully received at a second communications apparatus.

13. The communications apparatus according to claim 12, wherein the transceiver is configured to periodically read the first storage space.

14. The communications apparatus according to claim 12, wherein the processor is configured to determine that second storage space corresponding to the first transmission chip is in a write-inhibit state.

15. The communications apparatus according to claim 12, wherein after an amount of I2C data, comprising the first I2C data and the at least one second I2C data, is stored in a second storage space that meets a preset condition, the transceiver is configured to forward the stored I2C data to the second communications apparatus, wherein the second storage space is storage space of the transceiver.

16. The communications apparatus according to claim 12, wherein the transceiver is configured to receive third feedback information from the second communications apparatus, wherein the third feedback information is used to indicate the second feedback information respectively corresponding to one or more pieces of I2C data comprising the first I2C data and the at least one second I2C data.

* * * * *